United States Patent
Moreau et al.

(10) Patent No.: US 9,431,943 B2
(45) Date of Patent: Aug. 30, 2016

(54) ASSEMBLY OPERATING IN A VARIABLE REGIME

(71) Applicant: MOTEURS LEROY-SOMER, Angouleme (FR)

(72) Inventors: Luc Moreau, Angouleme (FR); Pierre Rigaud, Checy (FR); Thomas Verchere, Orleans (FR)

(73) Assignee: MOTEURS LEROY-SOMER, Angouleme (FR)

( * ) Notice: Subject to any disclaimer, the term of this patent is extended or adjusted under 35 U.S.C. 154(b) by 0 days.

(21) Appl. No.: 13/955,788

(22) Filed: Jul. 31, 2013

(65) Prior Publication Data
US 2013/0313828 A1    Nov. 28, 2013

Related U.S. Application Data

(63) Continuation of application No. PCT/IB2012/050717, filed on Feb. 16, 2012.

(30) Foreign Application Priority Data

Feb. 16, 2011   (FR) .................................... 11 51281

(51) Int. Cl.
*F03D 9/00*   (2016.01)
*H02P 9/04*   (2006.01)
(Continued)

(52) U.S. Cl.
CPC ............... *H02P 9/14* (2013.01); *H02K 19/28* (2013.01); *H02P 9/08* (2013.01); *H02P 9/30* (2013.01); *H02P 9/305* (2013.01); *H02P 9/48* (2013.01); *H02K 7/1838* (2013.01); *Y02E 10/725* (2013.01)

(58) Field of Classification Search
CPC .......... H02P 9/14; H02P 11/06; H02K 19/28
USPC ....................................... 290/44, 55
See application file for complete search history.

(56) References Cited

U.S. PATENT DOCUMENTS

| | | |
|---|---|---|
| 5,083,039 A | 1/1992 | Richardson et al. |
| 6,239,996 B1 | 5/2001 | Perreault et al. |

(Continued)

FOREIGN PATENT DOCUMENTS

| | | | |
|---|---|---|---|
| EP | 1187307 | * | 3/2002 |
| JP | 2007267586 | | 10/2007 |

(Continued)

OTHER PUBLICATIONS

Machine translation of abstract and description of EP 1187307, obtained via espacenet.com.*

(Continued)

*Primary Examiner* — Tulsidas C Patel
*Assistant Examiner* — Thomas Quigley
(74) *Attorney, Agent, or Firm* — Andriy Lytvyn; Smith & Hopen, P.A.

(57) ABSTRACT

The invention relates to electromechanical assemblies comprising an alternator, especially of high power, typically greater than or equal to 1MW, and a converter, the alternator comprising a rotor driven in rotation, by a wind turbine for example, and more particularly to wound rotor synchronous alternators. The drive can also take place by means of a tide-driven, hydraulic or marine-current-driven generator. An alternator comprises in a manner known per se a field winding, generally at the rotor, supplied with DC current either by split rings and brushes, or by an exciter, so as to generate in an armature winding, generally at the stator, an AC voltage.

16 Claims, 7 Drawing Sheets

(51) Int. Cl.
*H02P 9/14* (2006.01)
*H02K 19/28* (2006.01)
*H02P 9/30* (2006.01)
*H02P 9/48* (2006.01)
*H02P 9/08* (2006.01)
*H02K 7/18* (2006.01)

(56) References Cited

U.S. PATENT DOCUMENTS 6,437,996 B1 8/2002 Wobben
2003/0038483 A1 2/2003 Klaar

FOREIGN PATENT DOCUMENTS

JP 2009232497 10/2009
JP 2010148336 7/2010

OTHER PUBLICATIONS

Japanese Office Action with notification date of Dec. 14, 2015, and English translation, for corresponding Japanese patent application No. 2013-554043.

* cited by examiner

US 9,431,943 B2

1

ASSEMBLY OPERATING IN A VARIABLE REGIME

CROSS REFERENCE TO RELATED APPLICATIONS

This application is a continuation of PCT Patent Application No. PCT/IB2012/050717, titled "ASSEMBLY OPERATING IN A VARIABLE REGIME," filed Feb. 16, 2012, which claims priority to French patent application Ser. No. 11/51,281 with the same title and a filing date of Feb. 16, 2011, which is herein incorporated by reference.

BACKGROUND OF THE INVENTION

1. Field of the Invention

The present invention relates to the production of a mono or polyphase, for example three-phase, AC current and more particularly to the conversion of mechanical energy, obtained for example by virtue of a wind turbine, into electrical energy.

2. Brief Description of the Related Art

It is known to use a cage-type asynchronous machine as alternator, the cage-type asynchronous machine presenting advantages of simplicity and robustness. However, its operation at almost fixed speed may be to within slippage a source of noise due to the recurring modification of the orientation of the blades, and this may engender variations of mechanical torque on the shaft. Such torque variations may result in disturbance to the network, since the current drawn may undergo significant variations. Furthermore, the maximum of the theoretical power cannot be utilized for high wind speeds.

In the case where use is made of a cage-type asynchronous machine connected to the network via a power electronics interface, variable-speed operation is possible by virtue of a variable speed drive. The presence of a rectifier makes it possible to deliver a DC voltage and an inverter makes it possible to deliver an AC voltage of fixed frequency corresponding to that of the network, with a unit power factor. The nominal power of the alternator then determines the maximum power that can be provided by the wind turbine. However, the converters used are rated for the whole of the power exchanged between the alternator and the network. They therefore represent a significant cost, have non-negligible losses, and may give rise to disturbances which are detrimental to the efficiency and quality of the energy delivered. The use of such converters, which are necessarily over-rated for the whole of the nominal power of the generator, may give rise for example to up to 3% of the nominal power as losses.

The rectifier used may be a rectifier controlled under pulse width modulation (PWM). In this case, the transfer of reactive power may be controllable, but the transfer of active power remains the same as when a simple rectifier comprising a diode bridge is used.

In the case where a doubly fed asynchronous machine is used, the stator is linked directly to the network while the power electronics interface is inserted between the rotor and the network thus allowing a span of variation of the slippage and therefore of the rotation speed of the order of 30%. However, this is a machine that is of more complex construction and therefore more expensive and less reliable than the cage-type asynchronous machine. The stator of the machine being wired up directly to the network, it may also undergo large variations in current during network disturbances.

2

It is also known to use synchronous machines, especially comprising permanent magnets. In particular, the use of a permanent magnet alternator followed by a power electronics interface that can comprise a rectifier followed by an inverter is known for the conversion of wind energy. The span of variation of the rotation speed is typically from 30% to 120% of the nominal rotation speed. However, such alternators exhibit the drawback of significant cost, especially because of the presence of the permanent magnets as well as the impossibility of being able to de-excite the machine in the case of a defect, for example in the case of a short circuit or overspeed.

It is also known to use synchronous machines excited by a winding at the rotor drawing from the network via a power electronics interface that can comprise a rectifier followed by an inverter. The span of variation is of the same order of magnitude as for the magnet-type machine.

Application EP 1 187 307 A2 discloses an electric machine comprising a claw pole rotor, feeding to a converter. A claw pole rotor is characteristic of an electric machine of small size and low power.

U.S. Pat. No. 5,083,039 A discloses an asynchronous cage machine and the regulation acts on the parameters $i_d$ and $i_q$ so as to control the torque or the voltage.

U.S. Pat. No. 6,239,996 B1 relates to a machine intended to charge automobile batteries.

U.S. Pat. No. 6,437,996 B1 is aimed at switching to constant DC voltage so as to decrease the reactive power in order to transport energy with the least losses over several kilometers.

A need therefore exists to employ a wind energy conversion assembly having reduced bulk and reduced manufacturing cost.

A need also exists to benefit from an assembly making it possible to optimize the efficiency obtained.

SUMMARY OF THE INVENTION

The invention is aimed at meeting all or part of the aforementioned needs.

The subject of the present invention is thus, according to one of its aspects, an electromechanical assembly operating at variable regime, especially at variable speed, power or power factor. The assembly includes a synchronous alternator with wound rotor, supplied with DC current through a voltage $V_f$, especially by means of an exciter or of direct excitation by split ring and commutator, and delivering an output voltage $U_S$. The invention also includes a converter comprising a rectifier for rectifying the output voltage $U_S$ of the alternator, the rectifier possibly being pulse width modulation- or diode-based and optionally followed by a DC/DC converter, and the supply voltage $V_f$ powering the wound rotor being slaved to the output voltage $U_S$ of the alternator.

The assembly can comprise a regulator configured to act on the voltage $V_f$ so as to maintain the output voltage $U_S$ of the alternator at a preset value $U_{s\ eff\ ref}$. The supply voltage $V_f$ powering the wound rotor may be determined so as to minimize the difference between the output voltage of the alternator $U_S$ and the reference voltage $U_{s\ eff\ ref}$.

The reference voltage $U_{s\ eff\ ref}$ may be chosen so as to modify, especially maximize, the efficiency of the electromechanical assembly.

The reference voltage $U_{s\ eff\ ref}$ is preferably calculated so as to minimize at least one of the losses from the following list: iron losses, which are composed of losses by eddy currents and of losses by hysteresis, losses through the Joule effect at the rotor, losses through the Joule effect at the stator, losses by conduction of the converter, losses by switching of the converter.

The evolution of the voltage $U_S$ as a function of frequency is a straight line in the case of a regulation with constant U/f. This evolution of the output voltage $U_S$ as a function of frequency may be in the invention other than a straight line, U/f not being constant notably over the range of rotation speeds going from the smallest rotation speed (for example above 500 revolutions per minute) to the nominal speed (for example above 1500 revolutions per minute) where the power of the alternator tends to increase greatly. Over this range of speeds (for example 500-1500 revolutions per minute), the shape of the output voltage of the alternator as a function of frequency can be a succession of straight line segments with a slope which increases slightly from one segment to the other with rotation speed.

The curve giving the evolution of the output voltage and therefore of the voltage setpoint as a function of frequency may exhibit two portions joined by a very marked kink linking up with a plateau where the voltage remains constant. A conventional regulation where U/f is constant up to maximum U also exhibits a plateau where U remains constant, but with no kink.

With a regulation according to the invention, $U_S$ may be less than the voltage typically encountered in a regulation with constant U/f, up to a certain rotation speed, where the voltage then becomes a maximum.

The electromechanical assembly according to the invention makes it possible to afford the same advantages in terms of efficiency as an alternator with permanent magnets, without the drawbacks related to the presence of these permanent magnets. The assembly according to the invention indeed makes it possible to improve the cost of the assembly and the ease of maintenance. Furthermore, the assembly according to the invention may easily be de-excited, in contradistinction to a permanent magnet alternator.

The invention makes it possible to optimize the efficiency of the wound rotor alternator and of the associated converter operating at variable regime by modifying the voltage across the terminals of the wound rotor. The voltage is thus controlled by way of the excitation of the rotor.

The assembly according to the invention is less expensive to manufacture. Furthermore, in the case of a defect, for example a defect of the network, it is possible to act on the excitation voltage, this not being possible with a permanent magnet alternator. The assembly according to the invention can thus make it possible to remedy deficiencies of the electrical network, and this may make it possible to meet certain regulatory requirements.

Operation at variable regime makes it possible to optimize the energy captured by the wind turbine. Preferably, it is sought systematically to operate at the optimal regime, that is to say that for a given operating regime, that is to say a given wind speed, it is desired that the maximum power be provided. The alternator in accordance with the invention makes it possible to provide electrical energy at variable frequency, which has to be adapted to that of the network, this being achieved via the power converter, comprising the rectifier as well as an inverter, connected by way of a DC bus.

At too high a wind speed, the rotation speed of the wind turbine is limited to a maximum value to safeguard its integrity.

The global efficiency of the converter/machine assembly obtained, compared with that of a permanent magnet synchronous machine or with a wound rotor synchronous machine operating at constant voltage, is improved.

The reference voltage $U_{s\ eff\ ref}$ can depend on the operating regime of the assembly.

The reference voltage $U_{s\ eff\ ref}$ can depend on at least one of the speed, the power, the power factor, the thermal state of the machine, which may for example be known by means of thermal probes.

The expression "power factor" is understood to mean the characteristic of an electrical receiver which is, for an electric dipole powered under a time varying current regime (sinusoidal or otherwise), equal to the active power consumed by this dipole, divided by the product of the effective values of the current and of the voltage (apparent power). It always lies between 0 and 1. In particular, if the current and the voltage are sinusoidal functions of time, the power factor is equal to the cosine of the phase shift between the current and the voltage. The power factor is then commonly called "cos ϕ".

For a given operating regime, that is to say at a given speed and at a given power, the mechanical losses are fixed.

For a given operating regime, if the voltage is too high, the iron losses and the losses through the Joule effect at the rotor due to too large an excitation become significant. Conversely, the losses through the Joule effect at the stator remain low. Indeed, for a given power, if the voltage is high, the current is low. Conversely, too low a voltage leads to significant losses through the Joule effect at the stator and to iron losses at the stator and low losses through the Joule effect at the rotor. The losses of the converter are related to the stator currents, to the machine voltage and to the rectified voltage.

It is understood that there exists an optimal voltage between the two operating regimes which makes it possible to minimize the losses and to maximize the efficiency of the assembly. This optimal voltage is preferably chosen as reference voltage and may be calculated for each application.

It may be calculated prior to the operation of the assembly or be calculated in real time. It may be calculated in real time during the operation of the assembly, or as a variant be precalculated as a function of the application. It is for example possible to select a value of the reference voltage $U_{S\ eff\ ref}$ from among several prerecorded values, as a function of the application and/or of an operating regime, especially of a rotation speed of the rotor. The assembly can for example comprise a prerecorded table of precalculated values of several reference voltages $U_{s\ eff\ ref}$ each suited to a given operating regime. In an automatic manner, switching from one operating regime to the other involves changing the reference voltage.

In the case where the alternator comprises an exciter, the voltage $V_r$ making it possible to generate the necessary excitation in the exciter may be slaved to the effective output voltage $U_{s\ eff}$ provided by the alternator.

As a variant, the excitation of the wound rotor of the alternator may be direct, by split ring and commutator. In the case of a power supply to the rotor by a split ring and brush system, the voltage $V_f$ is controlled directly on the basis of the preset reference voltage $U_{s\ eff\ ref}$.

The assembly can comprise a regulator which controls electronic switches of the rectifier. The control of the rectifier may be slaved to the phase, to the power factor of the machine, to the intensity of the direct current $I_D$ and to the intensity of the quadrature current $I_Q$, all of which may be used to control the electronic switches of the rectifier. The output current of the rectifier can power the DC bus. The rectifier may be controlled so as to maintain a constant bus voltage. The assembly can comprise for this purpose a regulator, which makes it possible to slave a current reference of the regulator controlling the switches of the rectifier as a function of a voltage $U_{dc\ measured}$ measured across the terminals of the DC bus and of a reference voltage $U_{dc\ ref}$. This current reference may be a reference value of the intensity of the quadrature and/or direct current.

The subject of the invention is furthermore a generator, especially a wind turbine, comprising an assembly such as defined hereinabove.

The wind turbine can comprise a multiplier making it possible to increase the speed of a mechanical shaft of the assembly, driven in rotation by blades of the wind turbine, for example three blades.

The subject of the invention is furthermore a method for transforming mechanical energy, especially of wind origin, into electrical energy, especially by means of an assembly such as defined above, in which the rotor of a synchronous alternator with wound rotor is supplied with DC current at a voltage $V_f$ slaved to an output voltage $U_s$ of the alternator. It is sought especially to minimize the difference between the output voltage of the alternator $U_S$ and a preset reference voltage $U_{s\ eff\ ref}$.

It is advantageously possible to rectify in such a method the output voltage of the alternator with a pulse width modulation-type rectifier.

DESCRIPTION OF THE DRAWINGS

The invention may be better understood on reading the detailed description which follows of an exemplary embodiment of the invention and on examining the appended drawing in which.

DETAILED DESCRIPTION OF THE INVENTION

Figure 1:
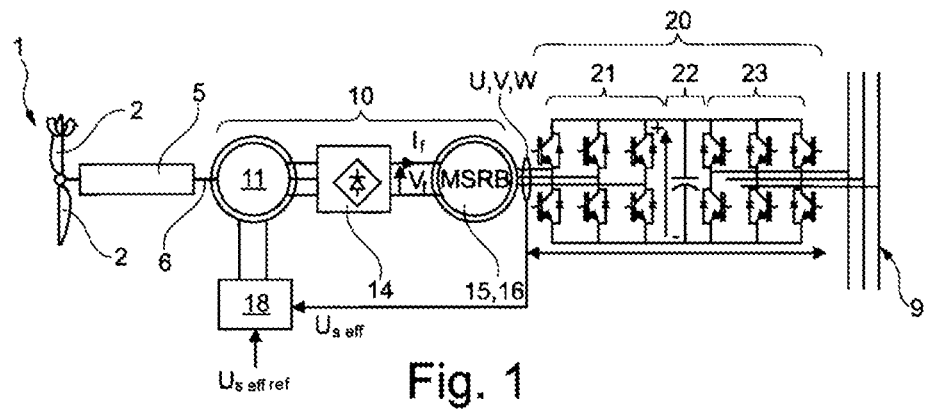
FIG. 1 represents in a schematic manner a wind turbine embodied in accordance with the invention.

Illustrated in FIG. 1 is a wind turbine 1 in accordance with the invention, comprising a nacelle to which are fixed blades 2, for example three blades, intended to be driven in rotation by the wind. The nacelle is fixed at the top of a mast, not represented. A multiplier 5 makes it possible to increase the speed of a mechanical shaft 6 of the wind turbine.

The nacelle houses a synchronous alternator 10 as well as a converter 20 for converting the wind energy received by the mechanical shaft 6 into electrical energy and for supplying a network 9. The alternator delivers for this purpose an output voltage $U_{s\ eff}$, for example a three-phase voltage, the three phases conventionally being designated U, V and W.

In the example described, the alternator comprises an exciter 11 having at the stator 12 an exciter field winding supplied with DC current so as to generate in an exciter armature winding of the exciter rotor 13 an AC current, which is thereafter rectified by a rectifier bridge 14 so as to supply the main field winding of the wound rotor 15 of the alternator with rectified current $I^F$ and generate a current in the main armature at the stator 16 of the alternator. Each phase of the main armature can comprise one or more windings.

Figure 2:
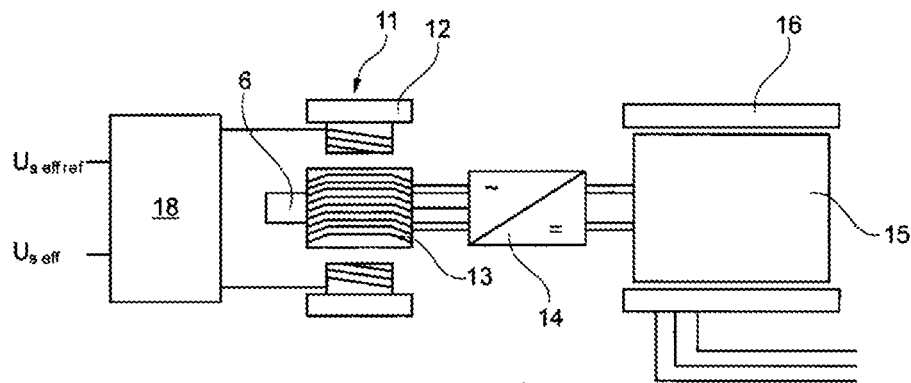
FIG. 2 illustrates in a schematic manner the configuration of the synchronous alternator of the wind turbine of FIG. 1.

The exemplary embodiment illustrated in FIGS. 1 and 2 uses a synchronous exciter 11 consisting of an inverted alternator, in which the excitation circuit is placed on the stator 12 and supplied with DC current at a voltage $V_r$ via a voltage regulator 18, so as to generate a fixed magnetic field. The rotor 13 of the exciter 11 comprises a system of three-phase windings whose currents are rectified by the diode bridge rectifier 14 which is rotating so as to supply the main inductor. The exciter is mounted on the mechanical shaft 6 and driven at the same speed as the main rotor 15.

In the exemplary embodiment illustrated, and having regard to the power, which may be of the order of several MWs, of the high-power alternators, it is beneficial to use the mechanical power available on the shaft 6 to provide the excitation current. An excitation system mounted on the same shaft as the rotor of the alternator is thus used. It could as a variant be otherwise.

It is possible to use a low-speed and high-torque synchronous alternator comprising a large number of pairs of poles, and therefore of large diameter. Advantageously, such an alternator makes it possible to avoid having to use a speed multiplier. This may be advantageous in so far as a speed multiplier is a complex mechanical item which may give rise to losses and faults.

Figure 3:
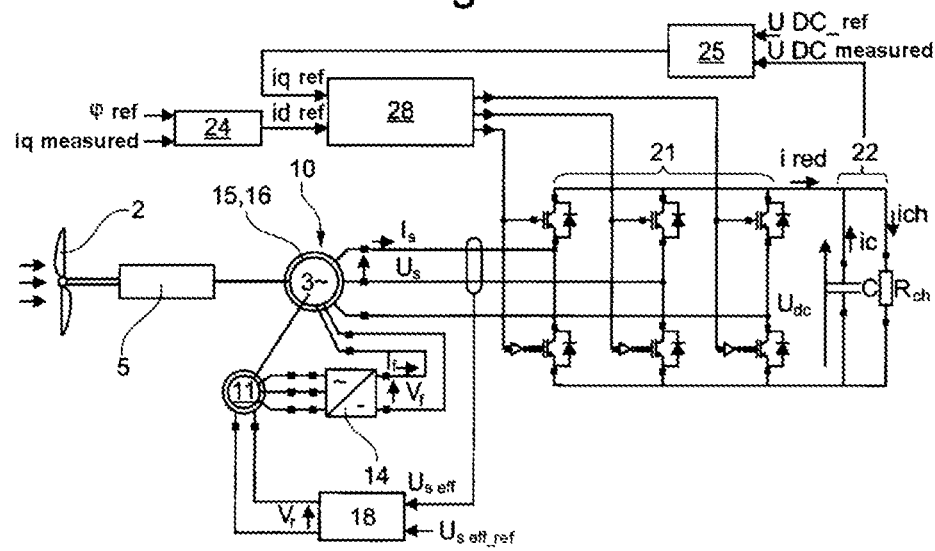
FIG. 3 represents in a schematic manner the operation of the alternator and of its associated converter.

The converter 20 and the regulation of the power supply voltage of the wound rotor, as well as that of the exciter 11, will now be described in greater detail while referring to FIG. 3.

The converter 20 comprises a pulse width modulation (PWM) type rectifier 21 which makes it possible to transform the AC voltage $U_{s\ eff}$ and the AC current $I_s$ which are delivered by the alternator into DC voltage and DC current.

The rectifier 21 is linked by a DC bus 22 comprising a capacitor C to an inverter 23 which recovers this DC voltage and this DC current. Control of the inverter is regulated so as to adjust and obtain at the output of the inverter a signal with an amplitude and a frequency that are suited to those of the network 9.

In the invention, the pulse width modulation rectifier 21 and the inverter 23 are decoupled from one another by way of the DC bus 22. Passage through the DC bus 22 allows the inverter 23 to regulate amplitude and frequency.

The rectifier 21 used may be bidirectional in power. It is possible to obtain sinusoidal currents by rejecting with appropriate control the harmonics at the high frequencies. For this purpose, the current is regulated at 28, as a function of the reference intensities of the direct current $I_{Dref}$ and of the quadrature current $I_{Qref}$ with a decoupling algorithm 29, by controlling the switches of the rectifier 21 so as to control the phase shift φ between the voltage and the current of the stator 16 of the alternator, this possibly allowing modification of the power factor cos φ. Regulation of the phase shift at 24 makes it possible to decrease the stator losses through the Joule effect, as a function of a reference phase shift $\phi_{ref}$ and of the measured quadrature intensity $I_{qmeasured}$, the stator and conduction Joule losses of the converter being a minimum for a power factor of 1. The global efficiency of the assembly is thus satisfactory.

It is possible, in a variant embodiment and as illustrated, to regulate at 25 the output power of the rectifier 21, as a function of a voltage $U_{dc\ measured}$ measured across its terminals and of a reference voltage $U_{dc\ ref}$, thereby allowing better local control of the power.

By way of example of regulators, it is possible to use standard regulators on the market, among which may be cited: the Leroy Somer models, for example D600, R449, the BASLER DECS 100, 200 models, the ABB Unitrol 1000 models, etc.

To embody the regulating assembly 24, 25 and 28, it is possible to use power converter modules (voltage and/or cos φ regulation) for example of ABB ACS800 type.

An example of regulations according to the invention will be described in a more developed manner with the aid of FIGS. 6 to 15.

Figure 6:
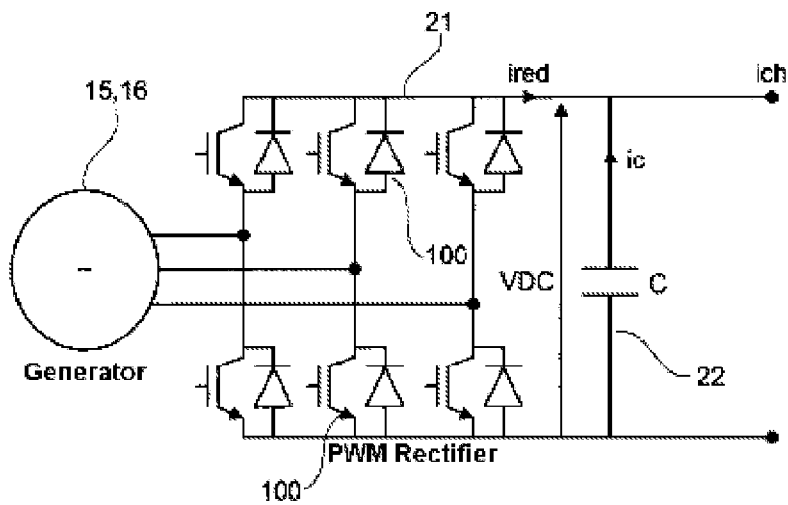
FIGS. 6 to 15 represent in a schematic manner how the regulation or regulations according to the invention may be modelled.

In the example developed, the rectifier 21 is of PWM type and it may be modelled as represented in FIG. 6. In the example developed, the rectifier 21 is bidirectional in power. Appropriate control of the rectifier can make it possible to obtain sinusoidal currents, with rejection of the harmonics at the high frequencies, in the alternator.

Control of the phase shift φ between the voltage and the current of the stator of the alternator may be performed, allowing a modification of the power factor cos φ of the machine.

It is thus possible to obtain sinusoidal currents minimizing the iron losses. The control of the phase shift φ can also make it possible to act on the losses through the Joule effect, the latter being a minimum for a cos φ equal to 1.

Nonetheless, such a control may not make it possible to reduce the losses by conduction and by switching of the converter to satisfactory values, the latter remaining of the order of 1.5% of the rated power.

The rectifier 21 can participate in the regulation at 25 of the voltage $U_{dc}$ of the DC bus 22, this regulation being able to make it possible to avoid over-rating the inverter 23.

In the exemplary implementation developed here of the invention, the components 100 of the rectifier 21 are considered to be perfect switches having the following Boolean behaviour:
0: Open,
1: Closed.

Figure 7:
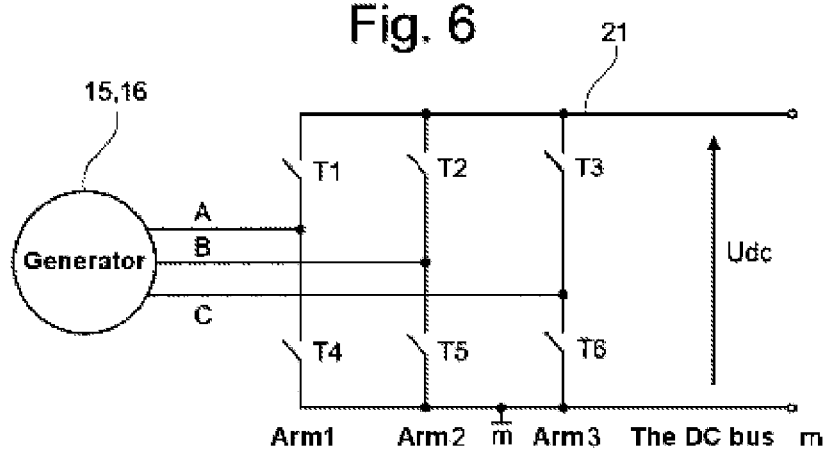

The elementary structure of the rectifier 21 is represented in FIG. 7.

The switches 100 are considered to be ideal and bidirectional in current.

The matrix representing the configuration of the rectifier 21 is defined as follows:

$$[MC] = \begin{bmatrix} T_1 & T_2 & T_3 \\ T_4 & T_5 & T_6 \end{bmatrix}$$

where T1, T2 and T3 are three switches having respectively as complement the switches T4, T5 and T6, as represented in FIG. 7. This matrix MC evolves in real time as a function of the control law.

By assuming that the voltage $U_{dc}$ across the terminals of the DC bus 22 is stable and by using the inverter convention, the referenced potentials A,B,C of each phase with respect to the point m (earth of the voltage $U_{dc}$) are $$\begin{bmatrix} v_{am} \\ v_{bm} \\ v_{cm} \end{bmatrix} = [Mc]^t \cdot \begin{bmatrix} U_{dc} \\ 0 \end{bmatrix}$$

The alternator being coupled as a star and connected to the input of the rectifier 21, it is possible to calculate the potentials across the terminals of each phase of the main armature winding 16 at the stator. Accordingly, the star coupling point of the alternator is defined by "n" and identical impedances for each phase and balanced voltages are considered.

With the conditions hereinabove, it is possible to establish the set of equations hereinbelow:

$$v_{an}+v_{bn}+v_{cn}0v_{an}=-(v_{bn}+v_{cn})$$

$$3 \cdot v_{an}=-3 \cdot (v_{bn}+v_{cn})$$

$$3 \cdot v_{an}=2 \cdot v_{an}-v_{bn}-v_{cn}$$

$$3 \cdot v_{an}=(v_{an}-v_{bn})+(v_{an}-v_{cn})=v_{ab}+v_{ac}$$

$$3 \cdot v_{an}=(v_{ax}-v_{bx})+(v_{ax}-v_{cx})$$

$$3 \cdot v_{an}=(v_{am}-v_{bm})+(v_{am}-v_{cm})$$

$$3 \cdot v_{an}=2 \cdot v_{am}-v_{bm}-v_{cm}$$

$$v_{an}=\tfrac{1}{3} \cdot (2 \cdot v_{am}-v_{bm}-v_{cm})$$

By proceeding in the same manner for $v_{bn}$ and $v_{cn}$, the following matrix equation is obtained:

$$\begin{bmatrix} v_{an} \\ v_{bn} \\ v_{cn} \end{bmatrix} = \frac{1}{3} \cdot \begin{bmatrix} 2 & -1 & -1 \\ -1 & 2 & -1 \\ -1 & -1 & 2 \end{bmatrix} \cdot \begin{bmatrix} v_{am} \\ v_{bm} \\ v_{cm} \end{bmatrix}$$

Figure 8:
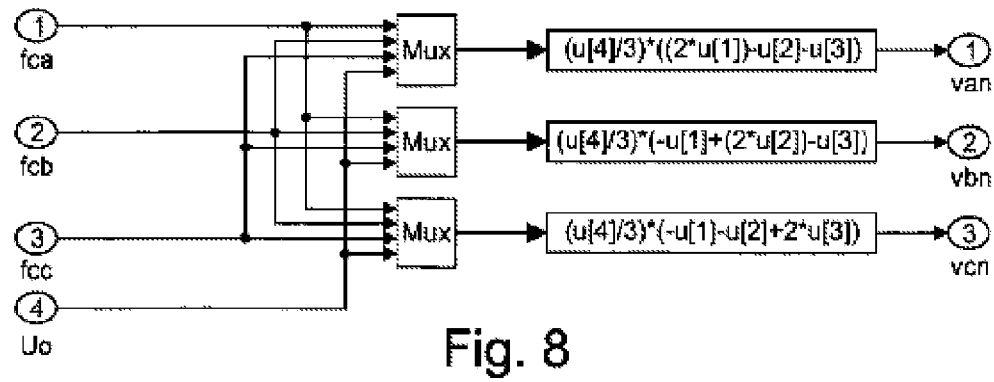

The rectifier model 21 in instantaneous magnitude which is represented in FIG. 8 by modelling with the Matlab-Simulink® software is therefore:

$$\begin{bmatrix} v_{an} \\ v_{bn} \\ v_{cn} \end{bmatrix} = \frac{1}{3} \cdot \begin{bmatrix} 2 & -1 & -1 \\ -1 & 2 & -1 \\ -1 & -1 & 2 \end{bmatrix} \cdot [MC]^t \cdot \begin{bmatrix} U_{dc} \\ 0 \end{bmatrix}$$

The rectified current $i_{rec}$ becomes $$i_{rec} = \begin{bmatrix} i_a & i_b & i_c \end{bmatrix} \cdot \begin{bmatrix} T_1 \\ T_2 \\ T_3 \end{bmatrix}$$

Figure 9:
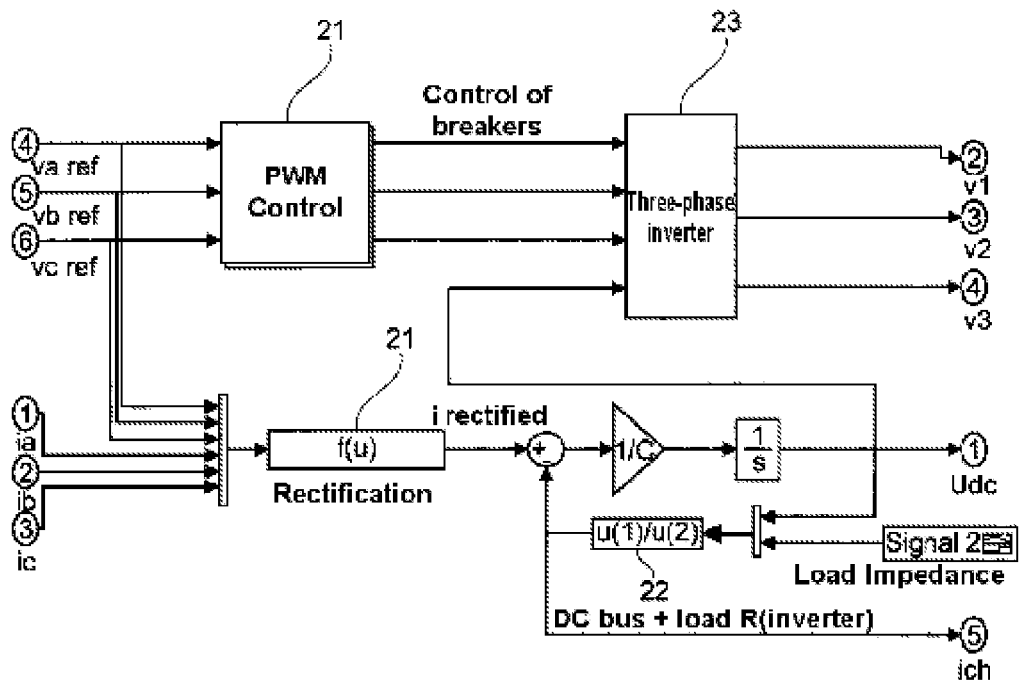
Figure 10:
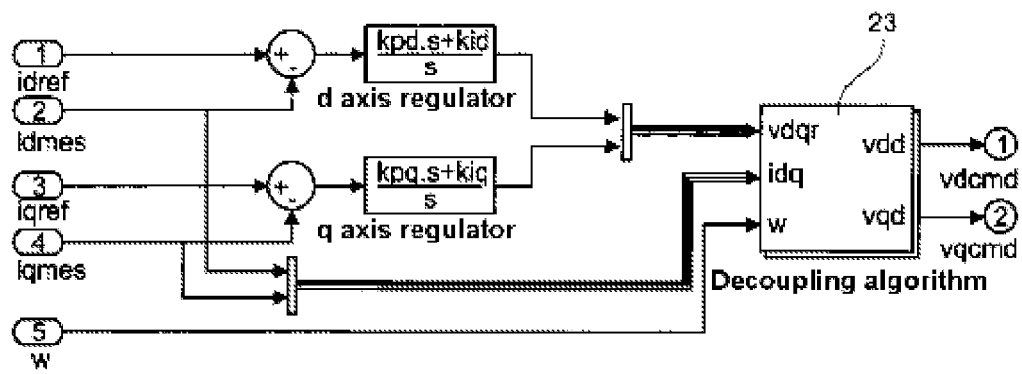

The behaviour of the DC bus 22 when the electromechanical assembly comprising the alternator and the rectifier 21 is loaded by an R//C circuit, as represented in FIG. 9, will now be studied.

The voltage $U_{dc}$ of the bus 22 and the load current $i_{ld}$ are related by the following equation:

$$i_c = C \cdot \frac{dU_{dc}}{dt} = i_{rec} - i_{ld} = (i_a \cdot T_1 + i_b \cdot T_2 + i_c \cdot T_3) - i_{ld}$$

where Tj (j=1, 2, 3) is a switching function.

In the example developed, the load R representing the inverter and the network is chosen so as to have a DC voltage $U_{dc}$ of 800 V under the nominal power 3.15 MW.

The resistance R can serve to simulate load impacts and see the behaviour of the system.

The voltage of the bus $U_{dc}$ is related to the load power and to the resistance by:

$$P_{dc} = \frac{U_{dc}^2}{R}$$

In the example developed, R is chosen equal to 0.2Ω. In the example developed, the voltage $U_{dc}$ must be regulated to the value of 800 V to ±5%.

$$\Delta U_{du} = 5\% \times U_{dc} = 40 \text{ V}$$

The value of the capacitor C of the DC bus 22 can, to a first approximation, be determined by making the assumption that the capacitor must be able to provide 10% of the nominal load current. Moreover, the voltage of the DC bus 22 must not, in the example developed, vary by more than 5% with respect to its nominal value.

Knowing that $$i_c = C \cdot \frac{dU_{dc}}{dt},$$

and therefore $$C = i_c \cdot \frac{\Delta t}{\Delta U_{dc}} = 10\% \cdot 2700 \cdot \frac{50 \cdot 10^{-3}}{5\% \cdot 800}$$

We consider $$\Delta t = 5 \cdot T = \frac{5}{f_{machine}} = \frac{5}{97} \approx 0.050 \text{ s}$$

Hence C≈250 mF

To study the regulation of the electromagnetic assembly, steady state operation is considered, while neglecting the stator resistance of the alternator.

The following equations may be obtained:

$$\begin{cases} V_d = -\omega \cdot L_q \cdot I_q \\ V_q = \omega \cdot L_d \cdot I_d + \omega \cdot \phi_f \end{cases}$$

and $$P = I_d \cdot V_d + I_q \cdot V_q = \omega \cdot \phi_f \cdot I_q$$

by considering a zero direct current $I_d$.

The active power of the machine thus depends on the quadrature current $I_Q$.

To within the efficiency of the rectifier 21, the active power of the machine corresponds to the power of the DC bus 22.

In the case of a magnet-type synchronous machine, two degrees of freedom are available to perform the regulation, namely the intensity of the direct current $I_D$ and the intensity of the quadrature current $I_Q$.

The current $I_Q$ may be used to regulate the DC bus 22 and the current $I_D$ may be used so as to regulate the phase shift φ between the current and the voltage of the stator 16 of the alternator, thereby giving the possibility of operating at cos φ=1.

To allow regulation of the currents in the plane DQ, it is preferable to remove the couplings between the axes $I_D$ and $I_Q$. This may be performed by using a decoupling algorithm 29, as may be seen in FIG. 10.

The aim of resorting to this decoupling algorithm is to reduce to two RL circuits along the two axes D and Q so that the calculation of the regulators to be used is simpler.

After decoupling of the variables between the two axes, the following matrix equation is obtained:

$$\begin{bmatrix} v_d \\ v_q \end{bmatrix} = \begin{bmatrix} R & 0 \\ 0 & R \end{bmatrix} \cdot \begin{bmatrix} i_d \\ i_q \end{bmatrix} + \begin{bmatrix} L_d & 0 \\ 0 & L_q \end{bmatrix} \cdot \begin{bmatrix} \frac{di_d}{dt} \\ \frac{di_q}{dt} \end{bmatrix}$$

The equations related to the currents are then of the form of a first-order system which may be regulated by way of a PI corrector.

The signals $V_d$ and $V_g$ are dispatched to a block allowing the switch DQ→abc, and then on to the stage for creating the controls of the switches 100 of the rectifier 21.

Figure 11:
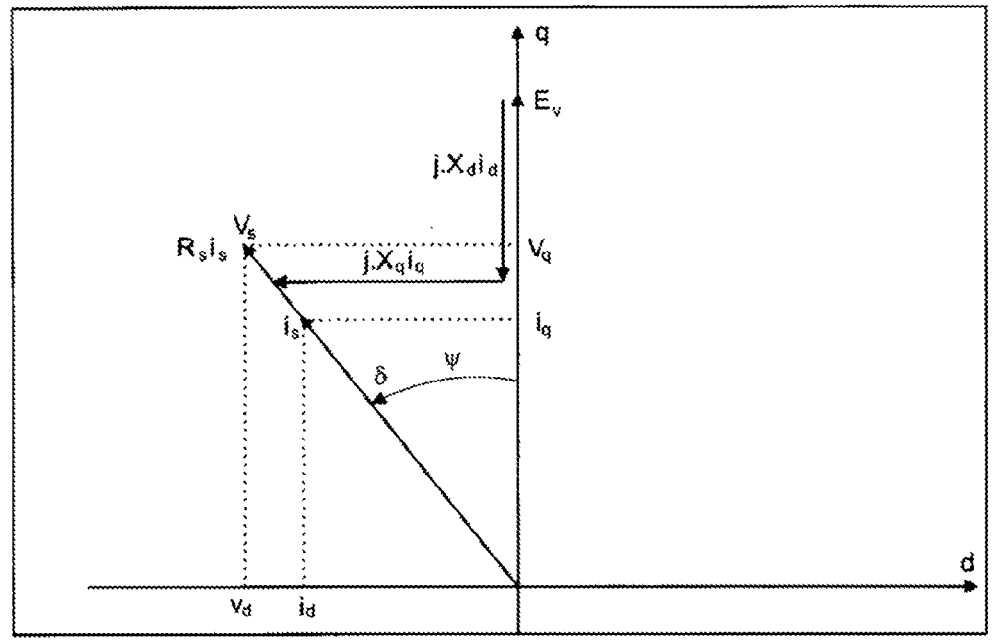

Within the framework of the regulation of the phase shift φ between the current and the voltage of the stator 16, the diagram of the voltages in the Park reference frame with motor convention has been represented in FIG. 11:

$$\vec{i_s} = \vec{i_d} + \vec{i_q} \text{ therefore } \begin{cases} i_d = i_s \cdot \sin\psi \\ i_q = i_s \cdot \cos\psi \end{cases} \text{ hence } \psi = \tan^{-1}\left[\frac{i_d}{i_q}\right]$$

it is therefore possible to adjust the internal phase shift angle φ with the aid of the current $I_d$.

It is noted that it is possible to operate with a cos φ equal to 1.

Figure 12:
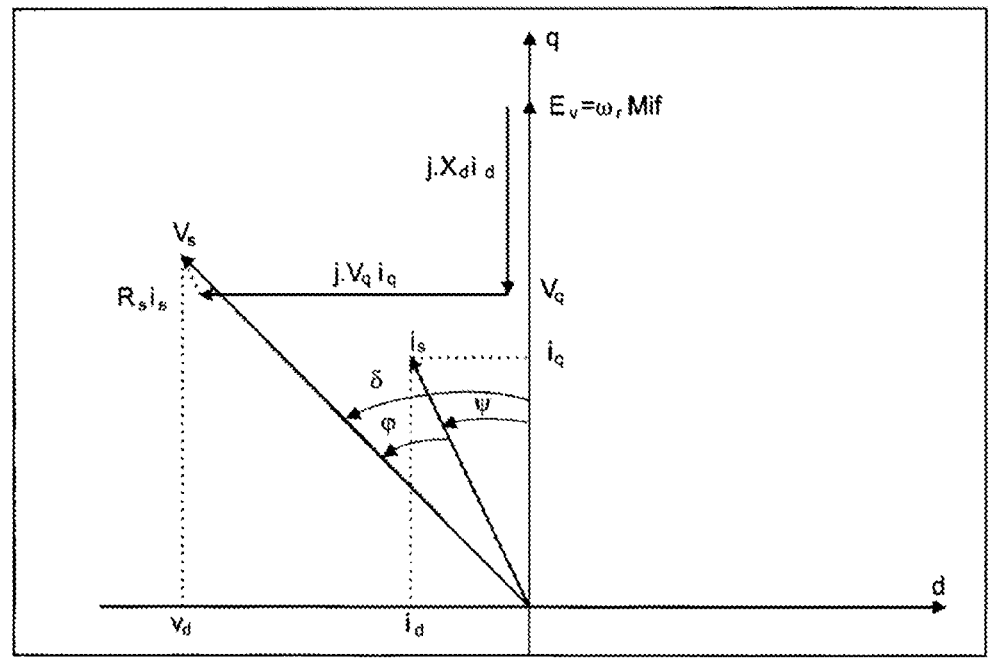

FIG. 12 represents the diagram of the voltages in the Park reference frame with motor convention with a cos φ equal to 1. An expedient represented in FIG. 12 may be used to deduce the internal phase shift angle allowing operation with unit power factor.

In the case of phase shift between the voltage and the current of the stator 16 equal to zero, we then have a stator voltage vector in phase with the stator current vector.

The reactive power is zero, consequently $Q = v_d \cdot i_q - v_q \cdot i_d = 0$ hence $v_d \cdot i_q = v_q \cdot i_d$ Therefore:

$$\frac{i_d}{i_q} = \frac{v_d}{v_q} = \frac{R_s \cdot i_d - w_r \cdot \Phi_q}{R_s \cdot i_q + w_r \cdot \Phi_d}$$

This leads to the following relation $\Phi_d \cdot i_d + \Phi_q \cdot i_q = 0$

By replacing the expressions for the currents $I_d$ and $I_q$ respectively by their projections $i_s \cdot \sin \psi$ and $i_s \cdot \cos \psi$, we obtain $L_d \cdot i_s^2 \cdot \sin^2 \psi + L_q \cdot i_s^2 \cdot \cos^2 \psi - M \cdot i_f \cdot i_s \cdot \sin \psi = 0$ Knowing that $\cos^2 \psi = 1 - \sin^2 \psi$ We make the change of variable $x = \sin \psi$ and solve the second-degree equation. We obtain:

$$\psi = \sin^{-1}\left[\frac{\Phi_f - \sqrt{\Phi_f^2 - 4 \cdot i_s^2 \cdot (L_d - L_q) \cdot L_q}}{2 \cdot i_s \cdot (L_d - L_q)}\right]_{\Phi_f \text{ being the excitation flux.}}$$

Knowing that the current $I_Q$ will be used to regulate the DC bus 22, the current $I_D$ is therefore calculated from the previous equation.

It is possible to determine the internal phase shift angle which corresponds to operation of the machine with $\cos \varphi = 1$.

And on the basis of this angle, the reference of the current $I_D$ is calculated.

Figure 13:
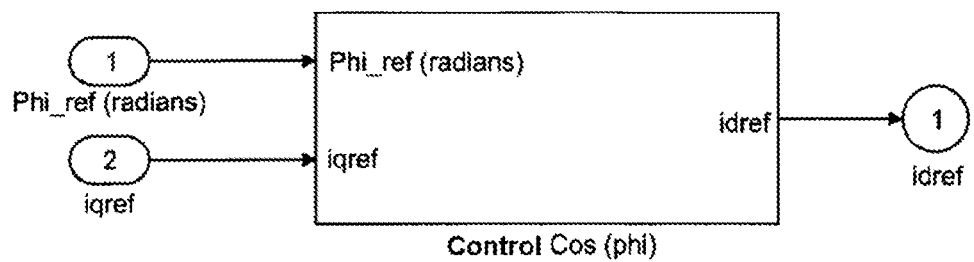

The regulation of the phase shift may be modelled with the aid of the Matlab-Simulink® software. Such a modelling is represented in FIG. 13.

For the regulation at 25 of the voltage $U_{dc}$ of the DC bus 22, the following assumptions will be used: the alternator is in the steady state, the stator resistance is neglected and the current $I_D$ is zero.

The matrix equations hereinbelow may be obtained:

$$\begin{bmatrix} -v_d \\ -v_q \end{bmatrix} = \begin{bmatrix} R_s & -L_d \cdot w \\ L_q \cdot w & R_s \end{bmatrix} \cdot \begin{bmatrix} i_d \\ i_q \end{bmatrix} + \begin{bmatrix} L_d & 0 \\ 0 & L_q \end{bmatrix} \cdot \begin{bmatrix} \frac{di_d}{dt} \\ \frac{di_q}{dt} \end{bmatrix} + \begin{bmatrix} 0 \\ e_q = \Phi_f \cdot w \end{bmatrix}$$

$$P_{machine} = v_d i_d + v_q i_q = v_q \cdot i_q = \Phi_f \cdot w \cdot i_q$$

$$\boxed{P_{dc} = \eta_{converter} \cdot P_{machine} = \eta_{converter} \cdot w \cdot \Phi_f \cdot i_q = U_{dc} \cdot i_{Ld}}$$

It is thus possible to regulate the voltage $U_{dc}$ of the DC bus 22 with the aid of the current $I_Q$.

This voltage may be regulated around a reference value with the aid of a PI regulator.

Figure 14:
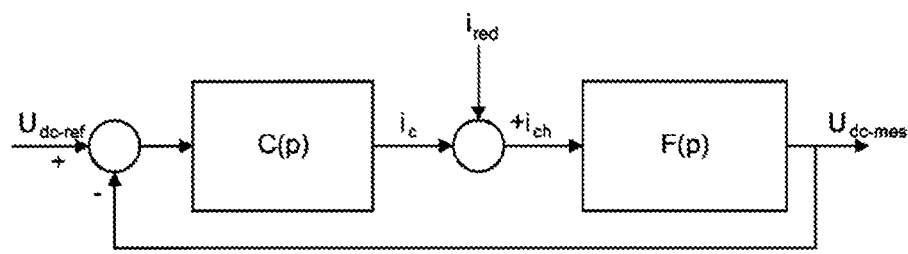

FIG. 14 represents in block diagram form a slaved system in which the value $U_{dc}$ is slaved to a reference value $U_{dc\ ref}$. C(p) denotes the transfer function for representing the PI regulator in the Laplace domain.

With $$\begin{cases} C(p) = K_p \cdot \left(1 + \frac{1}{T_i \cdot p}\right) \\ F(p) = \frac{1}{C \cdot p} \end{cases}$$

This results in:

$$\begin{cases} U_{dc}(p) = \underbrace{\frac{\frac{K_p}{C \cdot T_i}}{p^2 + \frac{K_p}{C} \cdot p + \frac{K_p}{C \cdot T_i}}}_{A(p)} \cdot U_{dcref}(p) + \\ \underbrace{\frac{\frac{p}{C}}{p^2 + \frac{K_p}{C} \cdot p + \frac{K_p}{C \cdot T_i}}}_{B(p)} \cdot (K_p \cdot U_{dcref}(p) - i_{Ld}(p)) \end{cases}$$

The term B(p) of the equation hereinabove tends to zero as $t \to \infty$ and the term A(p) makes it possible to calculate the parameters of the PI regulator.

By putting:

$$A(p) = \frac{W_n^2}{p^2 + 2 \cdot z \cdot W_n \cdot p + W_n^2}$$

where $W_n$ is the natural angular frequency and z is the damping coefficient.

Comparing terms in A(p) gives:

$$\begin{cases} K_p = 2 \cdot z \cdot W_n \cdot C \\ T_i = \frac{2 \cdot z}{W_n} \end{cases}$$

In the example developed, the passband of the voltage regulation is fixed at a typical value of 15 Hz i.e. $W_n = 2 \cdot \pi 15 = 94.3$ rd/s and z is set equal to 0.707 to obtain a fast response with a low overshoot.

For C=250 mF, the parameters of the PI regulator at 25 are then:

$$\begin{cases} K_p = 33.3 \\ T_i = 0.112 \end{cases}$$

In an analogous manner to the slaving of the current of the stator 16, it is possible to slave the output voltage of the stator 16 with a PI regulator.

In the example developed, the passband of the current slaving is higher than that of the voltage, for example by a ratio of 10 to 100.

An exemplary modelling with the aid of the Matlab-Simulink® software of the PWM control at 28 of the inverter 21 will now be described with reference to FIG. 15.

Figure 15:
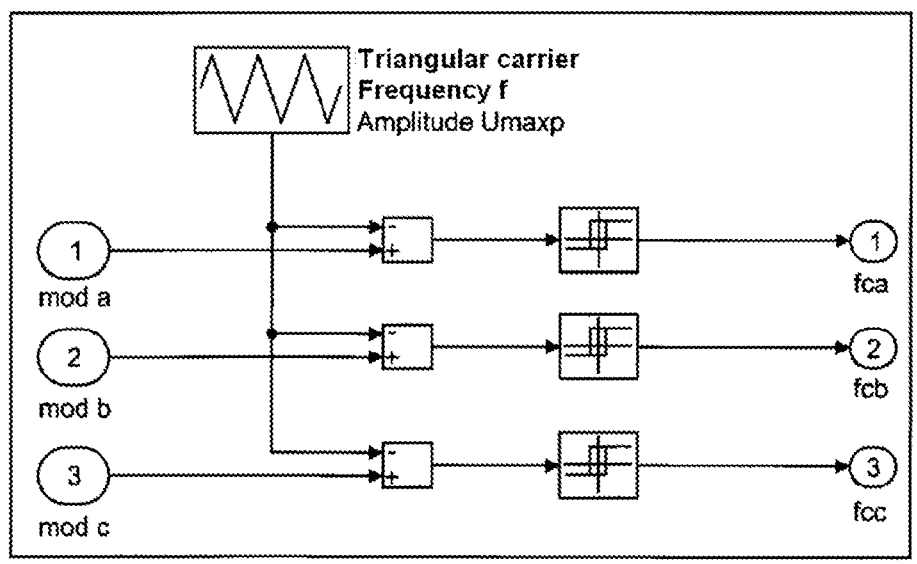

Here this entails a sine-triangle PWM control as shown by FIG. 15, the principle being to compare the carrier (high-frequency triangular signal) and a low-frequency sinusoidal signal arising from the regulators of the currents.

The sampling frequency used is 5 kHz in the example developed.

The input signals mod a, mod b, mod c are dispatched directly by the decoupling algorithm. At the output, the control signals for the switches 100 are recovered.

Such PWM control exhibits the advantage of a constant switching frequency, which is fixed by the frequency of the carrier.

In the invention, by virtue of the association of a wound rotor synchronous alternator with a rectifier, especially of pulse width modulation type, it is possible to employ the three degrees of freedom, namely the two intensities of the current of the alternator, direct $I_D$ and quadrature $I_Q$, and the alternator excitation current $I_F$. As explained in the example developed hereinabove, the quadrature current $I_Q$ is used to regulate the DC bus 22. The direct current $I_D$ is used to regulate the phase shift $\phi$. The excitation current $I_F$ can make it possible to adjust the level of the excitation, this current being used as input datum for an algorithm for optimizing the efficiency of the conversion chain. This search to minimize the losses through the excitation voltage can be done by a systematic study or by an algorithm of deterministic or stochastic type.

Figure 4:
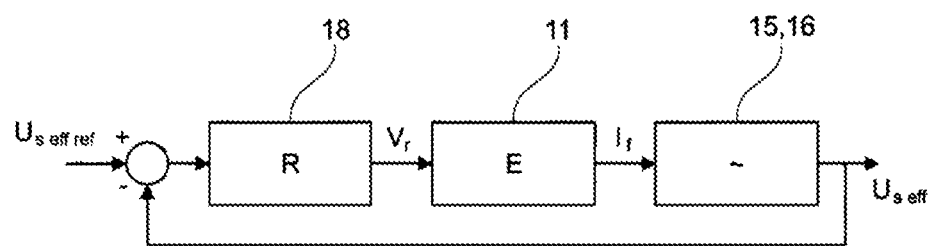
FIG. 4 is a schematic view of the control chain of the exciter.
Figure 4A:
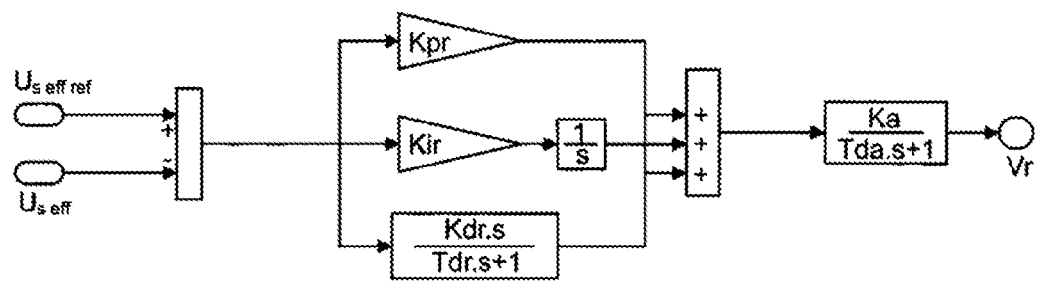
FIG. 4a is a block diagram illustrating the operation of the regulator 18, FIG. 5 indicates the efficiency of the assembly according to the invention compared with other known assemblies.

Finally, the voltage $U_{s\ eff}$ provided by the alternator 10 is used to slave by virtue of the regulator 18 the voltage $V_r$ making it possible to generate the necessary excitation in the exciter 11, as illustrated in FIG. 4, in such a way that the calculated difference with the preset reference voltage $U_{s\ eff\ ref}$ is a minimum Another exemplary implementation of the regulator 18 is illustrated in FIG. 4a. A regulator of PID type followed by a setpoint filter is used.

Order of magnitude of the coefficients (recalculated for each type of machine) of the regulator FIG. 4a:

| | |
|---|---|
| Kpr | [0 ... 1500] |
| Kir | [0 ... 200] |
| Kdr | [0 ... 12000] |
| Tdr | [0 ... 0.1] seconds |
| Ka | [0 ... 100] |
| Tda | [0 ... 0.05] seconds |

Figure 5:
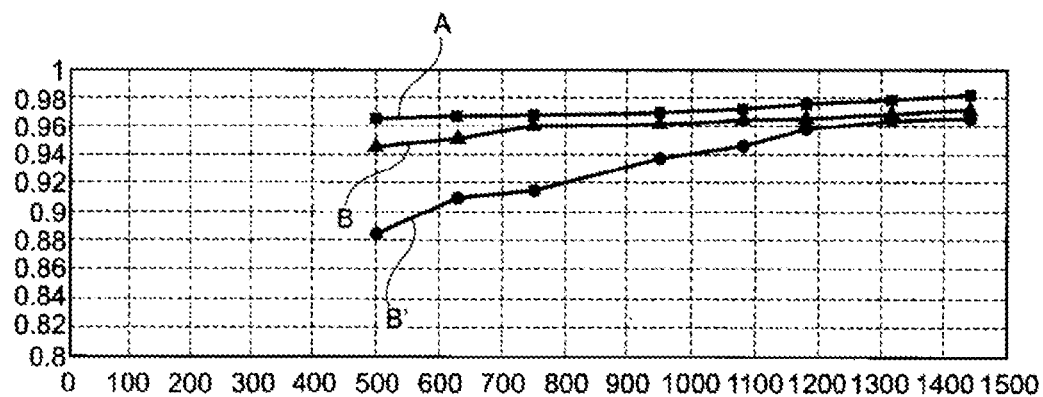

Modelling of the assembly according to the invention by means of a Park model makes it possible, compared with Park modelling of a permanent magnet synchronous alternator, to obtain the efficiencies A, B, B' illustrated in FIG. 5, given as a function of the rotation speed of the alternator in revolutions per minute. In a modelling, the inverter part 23 and network 9 may be regarded as a resistive load $R_{ld}$, as illustrated in FIG. 3.

For a span of speeds corresponding to the wind turbine production zone, namely between about 1080 and about 1440 rpm (nominal speed), the efficiency B of the assembly according to the invention is optimized, being very close to that A of a permanent magnet synchronous alternator. The efficiency B' is obtained with an assembly according to the invention, used without any efficiency optimization strategy (voltage $U_{s\ eff\ constant}$).

The efficiency optimization strategy used is to maximize the efficiency by minimizing a function representing the overall system losses.

Several approaches can for example be used. It is for example possible to use on-line optimization, in which losses are minimized by a real-time numerical scheme. It is also possible to use optimization by mapping, in which memory mappings are used to calculate the references of the physical magnitudes minimizing the losses. Finally, it is possible to use algebraic calculation.

An exemplary application with an algebraic approach taking into account the losses of the alternator and of the converter is developed hereinafter.

The losses of the machine may be modelled in the following manner:

Joule losses at the stator: $P_{js}=3.R_1.I_s^2$: (conventional+ additional losses), Joule losses at the rotor: $P_{jr}=R_f.I_f^2$, Iron losses: $P_{iron}=\text{Losses}_{Eddy}+\text{Losses}_{Hysteresis}$ this corresponding to the model most commonly used, hence $P_{iron}=k.\Phi^2=\{k_h.w+k_f.w^2\}.\Phi^2$ With $k_f$: Coefficient relating to the losses by eddy currents.

$k_h$: Coefficient relating to the losses by hysteresis, w: Electrical angular frequency.

By considering $$v_s = \frac{d\Phi}{dt} \text{ and } \overline{v}_s = j \cdot w \cdot \Phi \text{ hence } \Phi = \frac{V_s}{w}$$

$$P_{iron} = k \cdot \Phi^2 = \{k_h \cdot w + k_f \cdot w^2\} \cdot \Phi^2 = k_1 \cdot V_s^2 \text{ with } k_1 = \left(\frac{k_h}{w} + k_f\right)$$

On the basis of the trials of the machine and of the measurement of the iron losses, it is possible to calculate the coefficient $k_1$.

Therefore $P_{iron}=k_1.V_s^2$

Losses in the converter: in the literature, several works deal with modelling the losses of power converters. For simplicity, it is possible to estimate the losses in the converter at constant losses due to chopping and losses proportional to the square of the current $I_S$.

By performing trials on a given assembly, an operating curve is obtained. For each operating point, the losses and the efficiency of the assembly are calculated for various voltage values. At each operating point, the value of the voltage, termed the optimal voltage, for which the efficiency is maximal and therefore the losses minimal is logged. The energy optimization is then performed by choosing these optimal voltages for $U_{s\ eff\ ref}$ for each operating point of the wind turbine. The optimized voltage is then used as setpoint $U_{s\ eff\ ref}$ applied to the regulator 18.

The energy optimization makes it possible to achieve a gain in efficiency which is all the more beneficial the more significant the powers involved, the latter possibly being of the order of 1 to 11 MW, and having regard to the annual production time.

In the zone where the speed can vary up to a third of the nominal speed, optimization of the efficiency turns out to be very effective, this possibly being beneficial especially when it is sought to maximize the power extracted from the wind when the latter is light.

By adopting a strategy for optimizing the efficiency of the wound rotor synchronous machine, it is thus possible to approximate the performance of the permanent magnet synchronous machine, while avoiding the drawbacks related to the presence of the permanent magnets.

The direct and quadrature currents may be used to regulate the voltage of the DC bus, the torque, the useful power and the phase shift $\phi$.

Finally, the excitation can serve to maximize the efficiency and to manage overspeeds.

Conversely, a permanent magnet machine does not make it possible to adjust the excitation. In so far as the electromotive force varies linearly with rotation speed, there is a risk of overvoltage in the case of overspeed.

Figure 16:
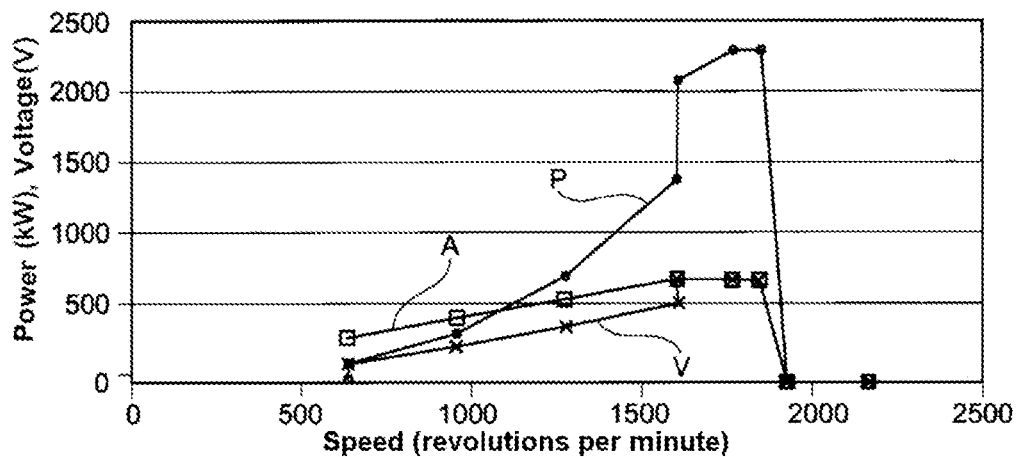
FIG. 16 represents the load curve for a wind turbine, and the curves giving the output voltage of the alternator as a function of speed.

FIG. 16 represents the evolution of the power of a wind turbine in kW as a function of the rotation speed of an alternator (curve P). The speed is expressed in revolutions per minute.

Figure 17:
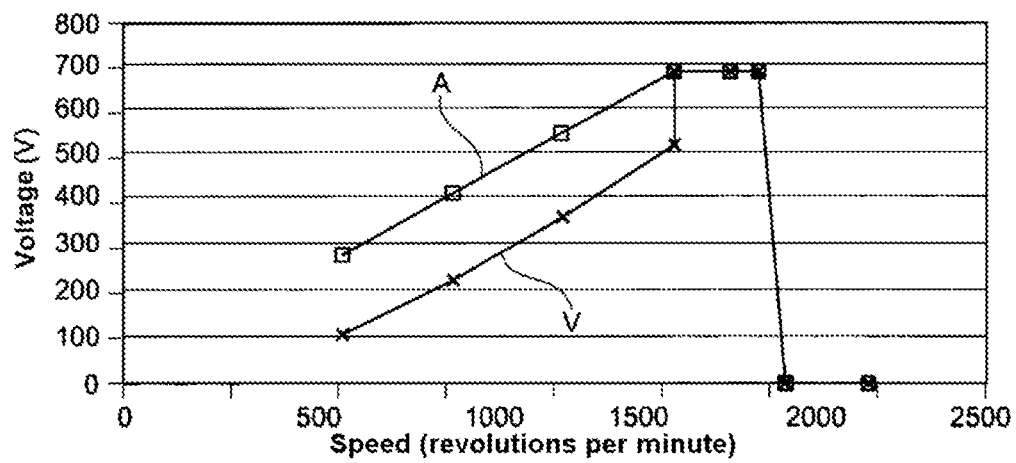
FIG. 17 represents in a more detailed manner the curve of output voltage as a function of speed.

Also plotted in FIG. 16, as well as in FIG. 17, is the evolution of the voltage as a function of rotation speed for a conventional machine regulated according to the prior art with constant U/f (curve A), and for an exemplary machine regulated in accordance with the invention (curve V).

The optimized regulating voltage U has been calculated as a function of the power and of the speed so as to minimize the losses. In particular, it is advantageously chosen so as to balance the iron losses and the Joule losses in order to minimize the sum thereof.

More particularly referring to FIG. 17, it is seen that when the power drops, the voltage drops so as not to magnetize the machine needlessly and create excessive iron losses. The optimized voltage may thus be less than the non-optimized voltage up to a certain speed, notably up to the nominal speed.

The curve giving the output voltage (and therefore the reference voltage) as a function of rotation speed for an optimized voltage may be different from a straight line for speeds below the nominal speed, in contradistinction to the case where the regulation is performed with constant U/f up to the nominal speed.

When the voltage according to a regulation with constant U/f becomes a maximum, the evolution of the voltage as a function of speed with U optimized according to the invention may exhibit a kink due to the sharp increase in the voltage in order to attain the maximum operating voltage, this being manifested by a kink at the level of the nominal speed on the curve, at 1600 revolutions per minute in the example illustrated.

Figure 18:
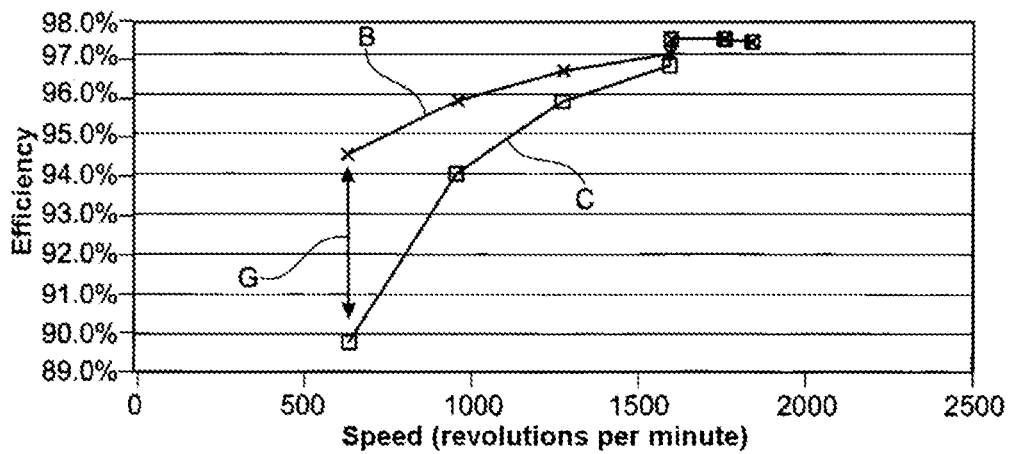
FIG. 18 represents the efficiency as a function of speed of the rotor of the alternator.

Represented in FIG. 18 is the efficiency obtained by virtue of the invention (curve B) and the efficiency without the invention with constant U/f (curve C), as a function of the speed expressed in revolutions per minute.

FIG. 18 illustrates the improvement in the efficiency obtained by virtue of the invention. It is seen that the gain (G) in efficiency is more significant at low speed, the wind turbine being more effective in weak wind.

The expression "comprising a" should be understood as being synonymous with "comprising at least one", unless specified to the contrary.

What is claimed is:

1. Electromechanical assembly operating at variable regime, especially at variable speed, power or power factor, comprising:
    a synchronous alternator with a wound rotor, supplied with DC current through a voltage ($V_f$), and delivering an output voltage ($U_S$);
    a converter comprising a rectifier for rectifying the output voltage ($U_S$) of the alternator, the supply voltage ($V_f$) powering the wound rotor being slaved to the output voltage ($U_S$) of the alternator;
    a regulator configured to act on the voltage ($V_f$) to maintain the output voltage ($U_S$) of the alternator at a reference voltage ($U_{s\ eff\ ref}$); and
    the reference voltage ($U_{s\ eff\ ref}$) being calculated so as to minimize at least one of the losses selected from the group consisting of iron losses, losses by eddy currents, losses by hysteresis, losses through the Joule effect at the rotor, losses through the Joule effect at the stator, losses by conduction at the converter, and losses by switching at the converter, wherein for rotation speeds below a nominal speed, the output voltage ($U_s$) is less than a regulating voltage within the framework of a regulation with constant $U_s/f$ over the whole of the range of speeds up to the nominal speed, where f is the frequency.

2. Assembly according to claim 1, wherein the reference voltage ($U_{s\ eff\ ref}$) depends on at least one of the speed, the power, the power factor, the thermal state of the alternator.

3. Assembly according to claim 1, wherein the reference voltage ($U_{s\ eff\ ref}$) is calculated in real time during the operation of the assembly.

4. Assembly according to claim 1, wherein the reference voltage ($U_{s\ eff\ ref}$) is precalculated prior to the operation of the assembly.

5. Assembly according to claim 1, the alternator having an exciter, whereby the voltage ($V_r$) enabling generation of the necessary excitation in the exciter being slaved to the output voltage ($U_S$) provided by the alternator.

6. Assembly according to claim 1, further comprising at least one split ring and one commutator for powering the wound rotor.

7. Assembly according to claim 1, wherein the output current of the rectifier powers a DC bus.

8. Assembly according to claim 7, further comprising a regulator for controlling the rectifier so as to maintain a constant bus voltage.

9. Assembly according to claim 8, the curve giving the output voltage ($U_S$) of the alternator as a function of rotation speed, exhibiting a kink when the rotation speed reaches the nominal speed.

10. Assembly according to claim 1, further comprising the curve giving the output voltage ($U_S$) of the alternator as a function of rotation speed, being different from a straight line for rotation speeds below the nominal speed.

11. Assembly according to claim 1, whereby the assembly is used in a wind turbine.

12. A method for transforming mechanical energy, into electrical energy, the method comprising:
    operating an assembly, the assembly comprising:
        a synchronous alternator with a wound rotor, supplied with DC current through a voltage ($V_f$), and delivering an output voltage ($U_S$);
        a converter comprising a rectifier for rectifying the output voltage ($U_S$) of the alternator, the supply voltage ($V_f$) powering the wound rotor being slaved to the output voltage ($U_S$) of the alternator to maintain the output voltage $U_S$ at a reference voltage ($U_{s\ eff\ ref}$) being calculated so as to minimize at least one of the losses selected from the group consisting of iron losses, losses by eddy currents, losses by hysteresis, losses through the Joule effect at the rotor, losses through the Joule effect at the stator, losses by conduction at the converter, and losses by switching at the converter, wherein for rotation speeds below a nominal speed, the output voltage ($U_s$) is less than a regulating voltage within the framework of a regulation with constant $U_s/f$ over the whole of the range of speeds up to the nominal speed, where f is the frequency;
    wherein the rotor of a synchronous alternator with a wound rotor is supplied with DC current at a voltage ($V_f$) slaved to an output voltage ($U_S$) of the alternator.

13. The method according to claim 12, wherein the output voltage ($U_S$) of the alternator is rectified with a pulse width modulation-type rectifier.

14. The assembly of claim 1, wherein the synchronous alternator is of a power greater than or equal to 1 MW.

15. The method of claim 13, wherein the synchronous alternator is of a power greater than or equal to 1 MW.

16. The assembly of claim 1, further comprising a second inverter which recovers the rectified output voltage of the alternator and is regulated so as to obtain at the output of this second inverter a signal with amplitude and frequency suited for a network to which energy is supplied by the assembly.

* * * * *